United States Patent [19]
Schmit

[11] Patent Number: 4,529,879
[45] Date of Patent: Jul. 16, 1985

[54] PROCESS FOR THE DETERMINATION OF ISOTOPES BY MASS SPECTROMETRY

[75] Inventor: Jean P. Schmit, Hull, Canada

[73] Assignee: Universite De Sherbrooke, Quebec, Canada

[21] Appl. No.: 485,500

[22] Filed: Apr. 15, 1983

Related U.S. Application Data

[63] Continuation-in-part of Ser. No. 368,967, Apr. 16, 1982.

[51] Int. Cl.$^3$ .................... G01N 27/62; C07B 23/00
[52] U.S. Cl. .................... 250/282; 250/281
[58] Field of Search .................... 250/282, 281

[56] References Cited

U.S. PATENT DOCUMENTS 3,493,743 2/1970 Newman .................... 250/282
3,579,270 5/1971 Daly .................... 250/282

*Primary Examiner*—Alfred E. Smith
*Assistant Examiner*—Jack I. Berman
*Attorney, Agent, or Firm*—Cushman, Darby & Cushman

[57] ABSTRACT

The invention relates to a mass spectrometry method for determining the absolute value of a given isotopic ratio of an unknown sample and/or the difference of isotope content between an unknown sample and a reference, which comprises (a) obtaining with or without chemical reaction a substrate capable of providing a fragmentation characteristic of the presence or absence of a specified isotope and usable to retrace the parent ions by the metastable ions technique consisting of accelerating voltage scan, (b) introducing said substrate into the source of a mass spectrometer followed by the ionization of said substrate, (c) retracing with metastable ions technique the parent ions of a daughter ion resulting from the loss of a neutral fragment characteristic of the presence or absence of the specified isotope in the substrate, (d) comparing the relative intensities, as expressed by peak areas or heights, of the metastable transitions between, first, said daughter ion and the substrate parent ion, and second, said daughter ion and a transition characteristic of another isotope of well known abundance and usable as internal reference.

9 Claims, No Drawings

PROCESS FOR THE DETERMINATION OF ISOTOPES BY MASS SPECTROMETRY

This is a continuation-in-part of Ser. No. 368,967 filed Apr. 16, 1982.

BACKGROUND OF THE INVENTION

Isotope determination in water or other specific substrate is an important tool in chemistry as well as in biochemistry. Among the most striking applications, I found: the quality control of the foods, the determination of the origin of wines, the geochemical history of organic material, numerous applications in nuclear chemistry and physics, the study of metabolism, and the measure of the total body water of living organisms. This latter method, for example, is based on isotope dilution with deuterium or oxygen-18 and is principally used for the understanding of the control of energy balance in humans, for the study of metabolism, or in estimating the body fat content in animals.

Although it is interesting to quantify many isotopic ratios, the most commonly measured are: D/H, carbon 13/12, oxygen 18/16, nitrogen 15/14, and sulphur 34/32.

As an example, several methods are available to quantify the D/H ratio in water: infrared spectrometry, freezing point, falling drop, gas chromatography, NMR spectrometry, and mass spectrometry. These methods have been widely discussed in the literature and only the latter exhibits the required accuracy and sensitivity to be used to detect the small changes in isotopic distribution of deuterium in water at parts-per-million (ppm) level or less.

Two principal approaches can be used by mass spectrometry: first, the direct measurement of the ratio of ether m/z 19/18 (HOD/HOH) or m/z 19/20 (HOD/-$HO^{18}H$) ion abundances in water samples, provided that the exact amount of oxygen isotopes can be estimated (Anal. Chem. 1953, 25, pp 130–134); second, the measurement of the D/H ratio in gaseous hydrogen samples (Biomed. Mass Spectrom., 1977, 4, pp 82–87).

Both methods suffer some drawbacks. The first is dependent on the accuracy of the evaluation of $H_3O^+$ abundance in peak m/z 19 and, although its influence can be minimized by increasing the source repeller voltage to a high value, this evaluation is still dependent on the source pressure, a parameter among the most difficult to control accurately. The second method is by far the most accurate but involves the use of a very sophisticated mass spectrometer especially designed for the measurement of the isotopic content. Such an instrument is expensive and often unavailable. Moreover, it requires a time consuming and tedious decomposition of water into pure gaseous hydrogen, which is usually done with a uranium furnace (Anal. Chem. 1980, 52, pp 2232–2243), and comparison with an external standard which has itself some inherent inaccuracies in its isotope composition due to the industrial method used for hydrogen preparation.

Similar difficulties occur with the other cited isotopic ratios which are usually measured as carbon dioxide for carbon 13/12 and oxygen 18/16, as molecular nitrogen for nitrogen 15/14, and as sulphur dioxide for sulphur 34/32.

Accordingly, it would be highly desirable if an unambiguous method suitable for a standard double focusing mass spectrometer was developed without or with minimum sample transformations and usable for as many as possible isotopic ratios.

Furthermore, it would appear highly desirable if a faster and more general method for mass spectrometry determination of: first, deuterium and oxygen-18 in water, and second, for other isotopes in appropriate substrates, can be developed for use with standard double focusing means spectrometer at ppm level from natural abundance up to high concentration of the studied isotopes. It would also appear to be highly desirable if a method could be developed which would be devoid of the prior art methods while also avoiding the necessity of excessive purification of the sample to be tested.

SUMMARY OF THE INVENTION

In accordance with the present invention, there is provided a novel method, based on a concept developed on deuterium and oxygen-18 content determination in water samples, for determining by mass spectrometry the isotope content in an appropriate substrate.

More specifically, the novel method of the present invention comprises:

(a) either interchanging the studied isotope as a single entity (e.g. H⇄D) or as a function (e.g. $O^{16}H \rightleftarrows O^{18}H$) with an appropriate substrate, or using a chemical reaction to yield an appropriate substrate involving the studied isotope, (b) providing a molecular fragmentation characteristic of the presence or absence of the studied isotope and usable to quantify the said isotope content through the use of either the metastable ions technique (accelerating voltage scan) or another appropriate method to retrace parent ions.

The mixture is then introduced into the source of a mass spectrometer and then ionized. The transitions between the daughter ion resulting from the loss of a neutral fragment characteristic of the presence or absence of the said isotope from the substrate and the parent ions are then retraced.

Finally, the relaive intensities of the specified transitions as measured by the ratio of peak areas or heights are used, with or without calibration with standards, to determine the difference of isotope content between the unknown sample and a reference.

A metastable ion is one that is sufficiently stable to leave the ionization chamber, but that decomposes before reaching the collector, see R. G. Cooks et al, Metastable Ions, pages 28 and 29, Scientific Publishing company (1973).

DETAILED DESCRIPTION OF THE INVENTION

The method of the present invention takes advantage of the capability of either double focusing mass spectrometers to retrace the parent ions of a given daughter ion by scanning up the accelerating voltage, the magnetic and electrostatic sectors being set on the daughter ion parameters, or multiple stages mass spectrometer to retrace the parent ions of a given daughter ion by scanning the first stage, the second stage being set on the daughter ion parameters. The main advantage of such a method is its extreme specificity and thus its ability to circumvent all the inherent problems of the isotope interferences and the presence of other concurrent ionic species. Moreover, because of the specificity of the approach, it allows one to simplify to a great extent the preparation of the sample and does not necessarily involve an especially designed and dedicated mass spectrometer for isotope measurements. Finally, the developed concept being in itself exceptionally stable, it allows one to reduce to a great extent the number of sophisticated and expensive accessories necessitated by the conventional methods. This is due to the fact that the present invention is based on only one specific ionic species instead of at least two different kind of ions for the conventional method.

The method can be best described on two specific examples.

A. Deuterium determination in water samples.

For a given $m_2^+$ daughter ion the fragmentation will be:

$$m_1^+(D) \rightarrow m_2^+ + m_3(D)$$

$$m_1^+(H) \rightarrow m_2^+ + m_3(H)$$

with $m_1^+(D)=m_1^+(H)+1$ and $m_3(D)=m_3(H)+1$ and where parent ions are $m_1^+(D)$ or $m_1^+(H)$ depending on the presence of deuterium or hydrogen atom, respectively. The only limiting factor for an accurate measurement is the necessity to have two intense metastable transitions to link together daughter and parent ions.

It will be appreciated that the direct measurement of $18^+(H) \rightarrow 17^+$ and $19^+(D) \rightarrow 17^+$ transitions in water is not easily accessible mainly because of the weakness of the corresponding metastable peaks.

Accordingly, in accordance with the present invention there must be used a substrate which is suitable for the interchanging reaction $RH+DOH \rightleftarrows RD+ROH$ and the measure of the RD/RH ratio after equilibration. The substrate could be an oxygen containing substrate or another organic capable of interchanging hydrogen and deuterium in an aqueous medium and capable of providing a fragmentation characteristic of the presence of absence of an interchanged deuterium so as to retrace the parent ions by either the metastable ions technique or another appropriate method.

As an example of a suitable substrate there may be mentioned 1-propanol. As a primary alcohol with three carbon atoms it undergoes the following fragmentation:

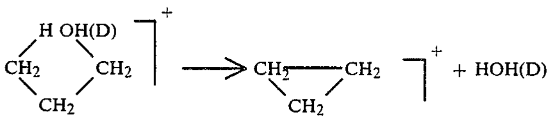

m/2 60(61) m/z 42 18(19)

The parent ions are m/z 60 or 61 depending on the very isotope nature of the hydroxylic hydrogen. Thus, providing that, first, the isotope effect during the interchanging reaction with 1-propanol can be kept constant, second, the deuterium content of the terminal methyl is constant, and third, the isotope effect during fragmentation is negligible or constant, measurement of the intensity ratio between $42^+ \rightarrow 61^+$ and $42^+ \rightarrow 60^+$ transitions (ROD/ROH ratio) is a direct measure of the deuterium content of the hydroxyl group of 1-propanol.

The possible isotope effect during the deuterium interchange reaction between water and 1-propanol can be circumvented by an appropriate control of the inlet system temperature. This is not a limiting factor because, first, the interchange reaction is extremely fast even at room temperature, and second, the septum inlet used for sample injection can be easily kept at an accurate temperature, thus keeping this effect, if it exists, constant.

The isotope effect occurs when a hydrogen in a reactant molecule is replaced by deuterium since there is often a change in the rate. Such changes are known as "deuterium isotope effects", see Advanced Organic Chemistry: Reaction Mechanisms and Structures, Chapter 7, pages 213–216, McGraw Hill (1968).

Natural deuterium and oxygen-18 abundances being 0.015% and 0.04%, respectively, one can expect from the above fragmentation of pure 1-propanol a basic ratio ROD/ROH of $2\times0.015+0.04=0.070$ for the studied transition. It has been found ROD/ROH $=0.0634+/-0.00005$ ($n=10$, each of them being the sum of 5 different readings), the difference from the expected value is attributed to the isotopic effect. Standard error is taken as $s/n^{\frac{1}{2}}$, where s is the standard deviation and n the number of samples. The validity of the method is confirmed by an additional piece of evidence: pure 1-propanol allowed to interchange its hydroxylic hydrogen with an equal volume of dueterium depleted water (natural abundance divided by 100) exhibits a ROD/ROH ratio equal to $0.0465+/-0.006$ ($n=9$).

Calibration curves with standards from 0.025% to 98.85% deuterium above natural level exhibit their best fit for a polynomial regression of degree 2 ($R^2=0.9994$). Calibration curves for deuterium concentrations ranging from 0% (pure water) to 0.1% can be reduced to a polynomial regression curve of degree 1 ($R_2=0.99988$). Table I shows the reproducibility of the measure. Table II shows the stability of the measure with a series of standards ranging from 0.0471% absolute, as exhibited when using deuterium depleted water, 0.147% deuterium. Higher concentration of deuterium (greater than 0.1%) were measured by comparison of peak heights and areas of the $42^+ \rightarrow 60^+$ and $42^+ \rightarrow 61^+$ transitions of 1-propanol while low deuterium concentrations (less or equal to 0.1%) were measured by comparison of $42^+ \rightarrow 61^+$ and $42^+ \rightarrow 62^+$ transitions. The latter transition, used as internal reference for low deuterium content, is based on the assumption that the water molecule lost during the specified transition can involve an oxygen-18 atom. This assumption holds true because oxygen-18 has a well known natural abundance of 0.204%. Thus, it can serve as an internal reference for an absolute deuterium determination in the specified conditions. Water standards were allowed for a few seconds to interchange deuterium and hydrogen with an equivalent volume of pure 1-propanol before injection into the source of the mass spectrometer.

Calibration curve with standards with 0.025% to 98.85% deuterium above natural level exhibits their best fit for a polynomial regression of degree 2 ($R^2=0.9994$). Calibration curves for deuterium concentrations ranging from 0% (pure water) to 0.1% can be reduced to a polynomial regression curve of degree 1 ($R^2=0.99988$). Table I shows the reproducibility of the measure.

TABLE I

REPRODUCIBILITY

| | Reference % | Sample % |
|---|---|---|
| mean | 0.06013 | 0.06164 |
| S.D.* | 0.06032 | 0.06170 |
| ppm | 0.06022 | 0.06152 |
| | 0.06022 | 0.06162 |
| | 0.00010 | 0.00027 |

TABLE I-continued

| REPRODUCIBILITY | |
|---|---|
| Reference % | Sample % |
| 0.0 | 16.0 |

*S.D.: Standard deviation

Pure 1-propanol was taken as reference. The unknown sample is a wine "St. Emilion appellation contrôlé". The deuterium content above natural level was measured by comparison of transitions 42+→61+ and 42+→62+ with oxygen-18 natural abundance (0.204%) as internal standard.

Table II shows the stability of the measure with a series of standards ranging from 0.0471% absolute, as exhibited when using deuterium depleted water, to 0.14% deuterium.

TABLE II

STABILITY OF THE MEASURE

| Deuterium % | Error S.D.* | Error % | n |
|---|---|---|---|
| 0.0471 (depleted) | 0.0002 | 0.4 | 4 |
| 0.0590 (pure) | 0.0001 | 0.2 | 5 |
| 0.0641 | 0.0002 | 0.4 | 5 |
| 0.0687 | 0.0002 | 0.2 | 5 |
| 0.0813 | 0.0003 | 0.4 | 5 |
| 0.1043 | 0.0002 | 0.2 | 5 |
| 0.1471 | 0.0003 | 0.2 | 5 |

*S.D.: Standard deviation

All the standards used were made by dilution from a stock solution of 0.1471% deuterium (about 1000 ppm above natural level). Deuterium depleted water was purchased from Sigma (natural level×100). n is the number of lectures for a given sample.

Higher concentration of deuterium (greater than 0.1%) were measured by comparison of peak heights and areas of the 42+→60+ and 42+→61+ transitions of 1-propanol while low deuterium concentrations (less or equal to 0.1%) were measured by comparison of 42+→61+ and 42+→62+ transistions. The latter transition, used as internal reference for low deuterium content, is based on the assumption that the water molecule lost during the specified transition can involve an oxygen-18 atom. This assumption holds true because oxygen-18 has a well known natural abundance of 0.204%. Thus, it can serve as an internal reference for an absolute deuterium determination in the specified conditions. Water standards were allowed for a few seconds to interchange deuterium and hydrogen with an equivalent volume of pure 1-propanol before injection into the source of the mass spectrometer.

B. Oxygen-18 determination in water sample

A similar approach has been developed for oxygen-18 determination from water samples.

Oxygen from water samples is selectively introduced into the carbonyl group of ethyl propanoate (propanoic acid, ethyl ester) through the hydrolysis of its triethyl ortho propionate ester derivative under acidic condition at room temperature. The reaction is highly reproducible and usable on a routine basis. The obtained ethyl propanoate is then injected into the instrument ion source through the septum inlet. Ethyl propanoate exhibits an intense transition resulting from the loss of water from the molecular ion and involving selectively the carbonylic oxygen. Thus, depending on the presence or the absence of oxygen-18, the studied transition will be 84+→102$^{30}$ or 84+→104+, respectively. Then, the transition intensities are used as described above for deuterium determination.

The calibration curve with standards from 0 to 1.5% oxygen-18 above natural level exhibits their best fit for a polynomial regression of degree 2 ($R^2=0.9997$). Calibration curves for oxygen-18 concentration ranging from 0% (pure water) to 0.5% can be reduced to a polynomial regression curve of degree 1 ($R^2=0.99997$). Table III shows the reproducibility of the measure.

TABLE III

OXYGEN-18 REPRODUCIBILITY

| | Reference % | Sample % |
|---|---|---|
| mean | 0.2003 | 0.2244 |
| S.D.* | 0.2001 | 0.2250 |
| | 0.2004 | 0.2246 |
| | 0.2004 | 0.2236 |
| | 0.2007 | 0.2246 |
| | 0.2004 | 0.2244 |
| | 0.0002 | 0.0005 |

*S.D. : Standard deviation

Tap water was taken as reference. The unknown sample is a standard involving 0.050 percent oxygen-18. The oxygen-18 content was measured by comparison of transitions 84+→102+ and 84+→104+.

Table IV shows the stability of the measure with a series of standards ranging from 0% as exhibited when using tap water to 1.5% oxygen-18.

TABLE IV

STABILITY OF THE MEASURE

| Oxygen-18 % | Error S.D. | Error % |
|---|---|---|
| 0.1875 | 0.0004 | 0.10 |
| 0.1905 | 0.0002 | 0.05 |
| 0.1941 | 0.0001 | 0.02 |
| 0.2244 | 0.0002 | 0.04 |
| 0.2622 | 0.0006 | 0.10 |
| 0.5504 | 0.0031 | 0.25 |
| 0.8852 | 0.0013 | 0.07 |
| 1.0960 | 0.0030 | 0.12 |

Oxygen-18 standards are expressed as the ratio of their transitions intensities 84+→104+ vs 84+→102+.

The percentage of error is expressed as $S.D./\sqrt{n}\times 100$ with n=5.

All the standards used were made by dilution from a stock solution of 1.5% oxygen-18 above natural level.

It should be emphasized that the accuracy of the present invention is substantially of the same order of magnitude as that of the more time-consuming and sophisticated conventional methods. Yet, the results obtained with the present invention do not require any specific accessories and any data acquisition system. Moreover, the time required for one experiment was reduced to seconds instead of up to 15 minutes for most of the conventional methods.

C. The same procedure can be applied for other isotope determination providing that an appropriate substrate is used for retracting parent ions resulting from the loss of a neutral fragment involving the studied isotope. It should be emphasized that the accuracy of the present invention is substantially of the same order of magnitude as that of the more time consuming and sophisticated conventional method. Yet, the results obtained with the present invention do not require any specific accessories and any data acquisition system. Despite that, the time required for one experiment was reduced to seconds instread of fifteen minutes for most of the conventional methods.

What is claimed is:

1. A mass spectrometry method for determining the absolute value of a given isotopic ratio of an unknown sample and/or the difference of isotope content between an unknown sample and a reference, which comprises (a) obtaining a substrate capable of providing a fragmentation characteristic of the presence or absence of a specified isotope and usable to retrace the parent ions by the metastable ions technique consisting of the accelerating scan, (b) introducing said substrate into the source of a mass spectrometer followed by the ionization of said substrate, (c) retracing with metastable ions technique the parent ions of a daughter ion resulting from the loss of a neutral fragment characteristic of the presence or absence of the specified isotope in the substrate, (d) comparing the relative intensities, as expressed by peak areas or heights, of the transitions between, first, said daughter ion and the substrate parent ion, and second, said daughter ion and a transition characteristic of another isotope of well known abundance and usable as internal reference.

2. A mass spectrometry method for determining the absolute value of deuterium content of an unknown aqueous sample and/or the difference of deuterium content between an unknown aqueous sample and a reference, which comprises (a) mixing a given volume of an aqueous sample with a substrate capable of interchanging hydrogen and deuterium in an aqueous medium, and capable of providing a fragmentation characteristic of the presence or absence of a specific deuterium and usable to retrace the parent ions by the metastable ions technique consisting of the accelerating voltage scan, (b) introducing said mixture into the source of a mass spectrometer followed by the ionization of said mixture, (c) retracing with the metastable ions technique the parent ions of a daughter ion resulting from the loss of a neutral fragment characteristic of the presence or absence of a specific deuterium in the substrate, (d) comparing the relative intensities, as expressed by peak areas or heights, of the transitions between, first, said daughter ion and the substrate parent ion, and second, said daughter ion and the substrate parent ion plus one mass unit, or the latter transition and a transition characteristic of another isotope of well known abundance and usable as internal reference.

3. A method according to claim 1 or 2, wherein the substrate is 1-propanol.

4. A mass spectrometry method for determining the absolute value of oxygen-18 content of an unknown aqueous sample and/or the difference of oxygen-18 content between an unknown aqueous sample and a reference, which comprises (a) introducing oxygen-18 from water samples into the carbonyl group of ethyl propanoate by hydrolysis of its triethyl ortho propionate ester derivative, and capable of providing a fragmentation characteristic of the presence or absence of a specific oxygen-18 and usable to retrace the parent ions by the metastable ions technique consisting of the accelerating voltage scan, (b) introducing said mixture into the source of a mass spectrometer followed by the ionization of said mixture, (c) retracting with the metastable ions technique the parent ions of a daughter ion resulting from the loss of a neutral fragment characteristic of the presence or the absence of a specific oxygen-18 in the substrate, (d) comparing the relative intensities, as expressed by peak areas or heights, of the transitions between, first, said daughter ion and the substrate parent ion, and second, said daughter ion and the substrate parent ion plus two mass units, or the latter transition and a transition characteristic of another isotope of well known abundance and usable as internal reference.

5. A method according to claim 1 wherein the substrate is ethyl propanoate.

6. A method according to claim 2 wherein the substrate is 1-propanol.

7. A method according to claim 4 wherein the substrate is ethyl propionate.

8. A mass spectrometry method for determining the absolute value of deuterium content of an unknown aqueous sample and/or the difference of deuterium content between an unknown aqueous sample and a reference, which comprises (a) mixing a given volume of an aqueous sample with a substrate capable of trapping hydrogen and deuterium from water samples by chemical reaction and capable of providing a fragmentation characteristic of the presence or absence of a specific deuterium and usable to retrace the parent ions by the metastable ions technique consisting of the accelerating voltage scan, (b) introducing said mixture into the source of a mass spectrometer followed by the ionization of said mixture, (c) retracing with the metastable ions technique the parent ions of a daughter ion resulting from the loss of a neutral fragment characteristic of the presence or absence of a specific deuterium in the substrate, (d) comparing the relative intensities, as expressed by peak areas or heights, of the transitions between, first said daughter ion and the substrate parent ion, and second, said daughter ion and the substrate parent ion plus one mass unit, or the latter transition and a transition characteristic of another isotope of well known abundance and usable as internal reference.

9. A method according to claim 8 wherein the substrate is 1-propanol.

* * * * *